United States Patent
Snellman et al.

(10) Patent No.: US 8,650,024 B1
(45) Date of Patent: Feb. 11, 2014

(54) GENERATING ADDRESS TERM SYNONYMS

(75) Inventors: Juho E. Snellman, Zurich (CH);
Fabrice Caillette, Zurich (CH)

(73) Assignee: Google Inc., Mountain View, CA (US)

( * ) Notice: Subject to any disclaimer, the term of this patent is extended or adjusted under 35 U.S.C. 154(b) by 481 days.

(21) Appl. No.: 13/086,017

(22) Filed: Apr. 13, 2011

(51) Int. Cl.
*G06F 17/27* (2006.01)

(52) U.S. Cl.
USPC ............ 704/9; 704/270.1; 704/270; 704/272; 707/706; 707/723; 707/724; 707/728; 707/740; 382/113; 455/456.1; 701/431

(58) Field of Classification Search
USPC ............................................................ 704/9
See application file for complete search history.

(56) References Cited

U.S. PATENT DOCUMENTS

| | | | | |
|---|---|---|---|---|
| 6,732,120 B1 * | 5/2004 | Du | | 715/764 |
| 6,934,634 B1 * | 8/2005 | Ge | | 702/2 |
| 7,039,640 B2 * | 5/2006 | Miller et al. | | 1/1 |
| 7,174,290 B2 * | 2/2007 | Loofbourrow et al. | | 704/9 |
| 7,324,666 B2 * | 1/2008 | Zoken et al. | | 382/113 |
| 7,469,182 B2 * | 12/2008 | Huang et al. | | 701/400 |
| 7,539,573 B2 * | 5/2009 | Schwerin | | 701/408 |
| 7,660,784 B1 * | 2/2010 | Virdy et al. | | 707/999.003 |
| 7,894,986 B2 * | 2/2011 | Hegedus et al. | | 701/426 |
| 7,917,464 B2 * | 3/2011 | Frank et al. | | 707/602 |
| 8,015,196 B2 * | 9/2011 | Taranenko et al. | | 707/758 |
| 8,112,437 B1 * | 2/2012 | Katragadda et al. | | 707/769 |
| 8,194,986 B2 * | 6/2012 | Conwell | | 382/224 |
| 8,195,683 B2 * | 6/2012 | Bolivar | | 707/765 |
| 8,250,074 B2 * | 8/2012 | Lee et al. | | 707/740 |
| 8,255,379 B2 * | 8/2012 | Govindachetty et al. | | 707/706 |
| 8,271,510 B2 * | 9/2012 | Sivakkolundhu et al. | | 707/758 |
| 8,301,364 B2 * | 10/2012 | Rolf et al. | | 345/601 |
| 8,331,958 B2 * | 12/2012 | Hein et al. | | 455/456.3 |
| 8,364,462 B2 * | 1/2013 | Joy et al. | | 704/2 |
| 8,463,774 B1 * | 6/2013 | Buron et al. | | 707/724 |
| 8,472,608 B2 * | 6/2013 | Bookstaff et al. | | 379/218.01 |
| 8,538,957 B1 * | 9/2013 | Zhou et al. | | 707/728 |
| 2002/0019699 A1 * | 2/2002 | McCarty et al. | | 701/211 |
| 2002/0116175 A1 * | 8/2002 | Stouffer et al. | | 704/9 |
| 2002/0124015 A1 * | 9/2002 | Cardno et al. | | 707/204 |
| 2004/0023666 A1 * | 2/2004 | Moon et al. | | 455/456.1 |
| 2004/0065598 A1 * | 4/2004 | Ross et al. | | 209/584 |
| 2005/0137991 A1 * | 6/2005 | Bruce et al. | | 705/410 |
| 2007/0233649 A1 * | 10/2007 | Wang et al. | | 707/3 |
| 2008/0091342 A1 * | 4/2008 | Assael | | 701/202 |
| 2008/0162035 A1 * | 7/2008 | Charlton et al. | | 701/207 |
| 2008/0319990 A1 * | 12/2008 | Taranenko et al. | | 707/5 |
| 2009/0037403 A1 * | 2/2009 | Joy et al. | | 707/5 |
| 2009/0150393 A1 * | 6/2009 | Bourland et al. | | 707/6 |

(Continued)

*Primary Examiner* — Pierre-Louis Desir
*Assistant Examiner* — Fariba Sirjani
(74) *Attorney, Agent, or Firm* — Bracewell & Giuliani LLP

(57) ABSTRACT

Methods, systems, and apparatus, including computer programs encoded on a computer storage medium, for generating address component synonyms. In one aspect, a method includes determining that a plurality of addresses cannot be geocoded by a geocoding system. Variants of the addresses that can be geocoded by the geocoding system are generated, wherein each variant of a respective address lacks a removed term. Name terms for each variant are provided by the geocoding system. Each removed term is associated with name terms received for all variants that lack the removed term, including determining, for each associated name term of each removed term, a count of the number of variants for which the geocoding system provided the name term. Whether a name term is an address term synonym for a removed term is determined based at least in part on the count of the number of variants.

30 Claims, 5 Drawing Sheets

(56) References Cited

U.S. PATENT DOCUMENTS

| | | | |
|---|---|---|---|
| 2009/0248605 A1* | 10/2009 | Mitchell et al. | 706/52 |
| 2009/0248687 A1* | 10/2009 | Su et al. | 707/6 |
| 2010/0036834 A1* | 2/2010 | Bandas | 707/5 |
| 2010/0049765 A1* | 2/2010 | Asher et al. | 707/723 |
| 2010/0115133 A1* | 5/2010 | Joshi | 709/245 |
| 2010/0325143 A1* | 12/2010 | Straub et al. | 707/769 |
| 2011/0004399 A1* | 1/2011 | Smartt et al. | 701/200 |
| 2011/0087695 A1* | 4/2011 | Sharma et al. | 707/769 |
| 2011/0161334 A1* | 6/2011 | Sivakkolundhu et al. | 707/758 |
| 2011/0320319 A1* | 12/2011 | Streich | 705/27.1 |
| 2012/0072287 A1* | 3/2012 | Crane et al. | 705/14.58 |
| 2012/0166473 A1* | 6/2012 | Ahmadi et al. | 707/769 |
| 2012/0265778 A1* | 10/2012 | Chen | 707/765 |
| 2013/0110515 A1* | 5/2013 | Guzzoni et al. | 704/270.1 |
| 2013/0151512 A1* | 6/2013 | Ahuja et al. | 707/724 |

\* cited by examiner

GENERATING ADDRESS TERM SYNONYMS

BACKGROUND

This specification relates to processing textual descriptions of geographic locations.

Computer systems process textual descriptions of geographic locations for various purposes, e.g., to provide maps, directions, phone numbers, advertisements, and so on. Often, computer systems geocode postal addresses. Geocoding is the process of translating a textual description of a location (e.g., a postal address) into a geographic location (e.g., latitude and longitude coordinates). Effective geocoding requires recognition of various terms used to describe geographic locations and synonyms of those terms (e.g., "st." and "street").

SUMMARY

An address term synonym system determines a list of address terms and synonyms for those address terms. The address terms are terms that are not recognized by a geocoding system. The list of address terms and synonyms can be inspected, e.g., by a system administrator or other user of the geocoding system, and the geocoding system can be updated to recognize the address terms by translating the address terms to synonyms recognized by the geocoding system. The address term synonym system determines the list of address terms and synonyms by attempting to geocode addresses using the geocoding system, removing terms from addresses not successfully geocoded and attempting to geocode the addresses without the removed terms, and associating removed terms that result in successful geocoding with names of locations.

In general, one innovative aspect of the subject matter described in this specification can be embodied in methods that include the actions of determining that a plurality of addresses cannot be geocoded by a geocoding system, wherein each address includes a plurality of terms; generating a plurality of variants of the addresses that can be geocoded by the geocoding system, wherein each variant of a respective address lacks a removed term included in the respective address; receiving a plurality of name terms for each variant provided by the geocoding system; associating each removed term with name terms received for all variants that lack the removed term, including determining, for each associated name term of each removed term, a count of the number of variants for which the geocoding system provided the name term; determining, for each associated name term of each removed term, whether the name term is an address term synonym for the removed term based at least in part on the count of the number of variants. Other embodiments of this aspect include corresponding systems, apparatus, and computer programs, configured to perform the actions of the methods, encoded on computer storage devices.

These and other embodiments can each optionally include one or more of the following features. Determining whether the name term is an address term synonym for the removed term comprises: determining a total number of variants that lack the removed term; and determining whether the count of the number of variants divided by the total number of variants exceeds a threshold, and if it does exceed the threshold, determining that the name term is an address term synonym for the removed term. The actions further include: for each name term associated with any removed term: for each removed term associated with the name term, incrementing a counter based on the count of the number of variants of the name term; and determining whether to remove the name term from consideration as an address term synonym based on a value of the counter. Incrementing the counter based on the count of the number of variants comprises: dividing the count of the number of variants by a total number of variants that lack the removed term; and determining whether the count of the number of variants divided by the total number of variants that lack the removed term exceeds a first threshold, and if so, incrementing the counter; and determining whether to remove the name term from consideration includes: dividing the counter by a total number of removed terms associated with the name term; and determining whether the counter divided by the total number of removed terms exceeds a second threshold, and if so, determining to remove the name term from consideration as an address term synonym. The actions further comprise providing a list of removed terms and address term synonyms for the removed terms for human inspection. The actions further comprise, for each removed term having any address term synonyms, adding the address term synonyms to a repository of address term synonyms for the geocoding system. Determining that a plurality of addresses cannot be geocoded by a geocoding system includes attempting to geocode each potential address in a corpus of potential addresses by sending each potential address to the geocoding system. Each potential address is an address for a same country. The geocoding system is configured to geocode addresses having missing terms. The names for a geocoded location of a variant include one or more of: a street name, a city name, a region name, an International Organization for Standardization (ISO) region code, a country name, a postal code, and a high precision postal code.

Particular embodiments of the subject matter described in this specification can be implemented so as to realize one or more of the following advantages. A corpus of addresses, e.g., for a given country, can be analyzed to determine address terms in the corpus that are not recognized by a geocoding system. Synonyms of the address terms can be determined. The geocoding system can be updated to recognize the address terms by translating those terms into recognizable synonyms. The geocoding system can successfully geocode a wider range of addresses.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
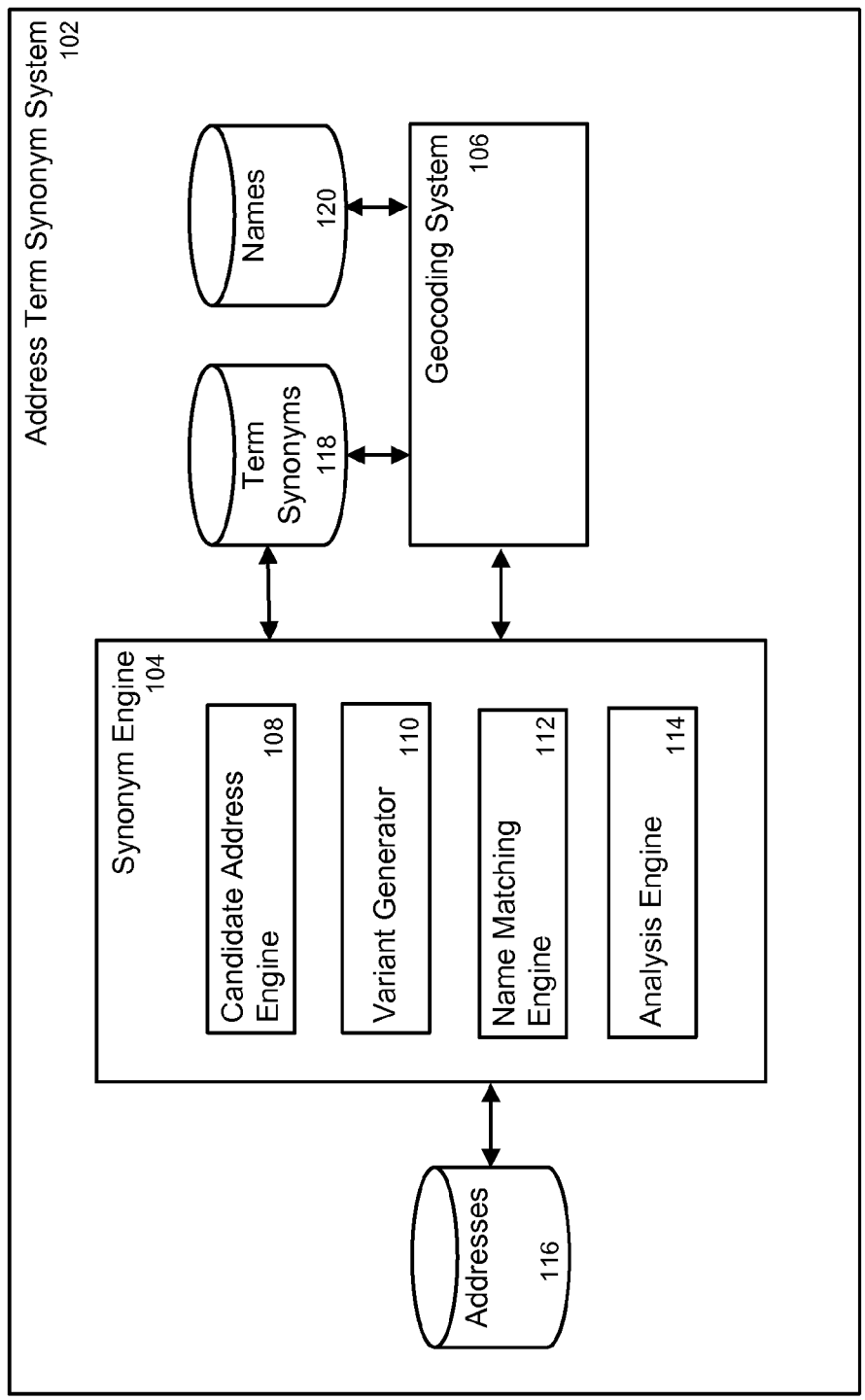
FIG. 1 is a schematic diagram of an example address term synonym system including a synonym engine and a geocoding system.

FIG. 1 is a schematic diagram of an example address term synonym system 102 including a synonym engine 104 and a geocoding system 106. The address term synonym system 102 is implemented as one or more software programs executing on one or more computers.

The address term synonym system 102 determines a list of address terms and synonyms for those address terms. The address terms in the list are terms that are not recognized by the geocoding system 106. The synonyms in the list are terms that can have the same meaning as the address terms in the context of an address. If a synonym of an address term is recognized by the geocoding system 106, the geocoding system 106 can be updated to recognize that term by translating it to the recognized synonym.

The geocoding system 106 is configured to translate a textual description of a location into geographic coordinates. For example, the geocoding system 106 can receive a postal address and determine latitude and longitude coordinates for the postal address. This is useful, for example, for providing maps, driving directions, and business listings. Various conventional geocoding techniques can be used to implement the geocoding system 106.

In general, the geocoding system 106 receives addresses as input. An address can be from, for example, a corpus of addresses 116, or from a search query received by a search system. If the geocoding system 106 is not able to successfully geocode the address, the geocoding system 106 returns as output an indication of failure. For example, the geocoding system 106 can be unsuccessful because an address contains an unrecognized term. If the geocoding system 106 is successful in geocoding the address, the geocoding system 106 returns as output information about the location of the address, for example, latitude and longitude coordinates. The geocoding system 106 can return name information for a location, including, for example, a street name, a city name, a region name, an International Organization for Standardization (ISO) region code, a country name, a postal code, and a high precision postal code. The name information can be stored in a database of names 120.

The geocoding system 106 is configured to successfully geocode various addresses that are missing terms. For example, a full postal address for the United States includes a zip code term, yet the geocoding system 106 can successfully geocode an address without a zip code term. In another example, a street name in an address typically includes a term indicating that the street name is a street, e.g., "street," "lane," "road," and so on. The geocoding system 106 can successfully geocode an address that is missing a term indicating that the street name is a street.

The synonym engine 104 uses a corpus of addresses 116 and the geocoding system 106 to determine address terms not recognized by the geocoding system 106. The synonym engine 104 determines synonyms for those address terms using the names of locations 120 using processes described in more detail below.

The synonym engine 104 includes a candidate address engine 108. The candidate address engine 108 is configured to generate a list of candidate addresses that potentially include address terms not recognized by the geocoding system 106. The candidate address engine 104 sends addresses, e.g., addresses from the corpus of addresses 116, to the geocoding system 106, resulting in successfully geocoded addresses and unsuccessfully geocoded addresses. The candidate address engine 104 determines that the unsuccessfully geocoded addresses are candidate addresses. For example, the candidate address engine 104 can perform the process 200 illustrated in FIG. 2 described below.

The variant generator 110 is configured to generate variants of candidate addresses from the candidate address engine 108. Typically, the variant generator 110 generates variants by removing one or more terms from candidate addresses (e.g., transforming "5 Long La, London, N3 UK" to "5 Long London N3 UK.") The variant generator 110 sends the variants to the geocoding system 106, resulting in successfully geocoded variants and unsuccessfully geocoded variants. For example, the variant generator 110 can perform the process 300 illustrated in FIG. 3 described below.

The name matching engine 112 is configured to match names of locations with transformations that resulted in successfully geocoded variants of the variant generator 110. For each successfully geocoded variant, the name matching engine 112 associates names from the names database 120 with the transformation used in generating the successfully geocoded variant. The names are names associated with the location determined by the geocoding system 106 for the successfully geocoded variant. The transformation is, for example, the term that was removed. The names typically include more than one name terms, and the name matching engine 112 can associate the transformation with each name term of each name.

The analysis engine 114 analyzes the transformations and their associated names from the name matching engine 112 to determine candidate address term synonyms. In some implementations, the analysis engine 114 aggregates the results for each transformation (e.g., each removed term). The results for each transformation include, for each name or name term associated with the transformation, the number of times that the name matching engine 112 associated the name or name term with the transformation. The analysis engine 114 can discard names or name terms that are associated a large number of times with a large number of transformations (e.g., because those terms are likely to be common to all address in the corpus of addresses 116). The analysis engine 114 can determine that name or name terms associated with a transformation a large number of times are candidate address term synonyms for that transformation. The candidate address term synonyms can be added to a repository of address term synonyms 118. For example, the analysis engine 114 can perform the process 400 of FIG. 4 described below.

The synonym engine 104 can use the candidate address term synonyms in various applications. For example, the synonym engine 104 can present a list of candidate address term synonyms for human inspection, e.g., by a system administrator of the geocoding system 106. A system administrator or other user can inspect the list and determine whether it would be useful to update the geocoding system 106 to perform the transformations, e.g., so that it can successfully geocode all of the addresses from the corpus of addresses 116. The geocoding system 106 can use the repository of address term synonyms 118 to perform the transformations associated with those terms.

Figure 2:
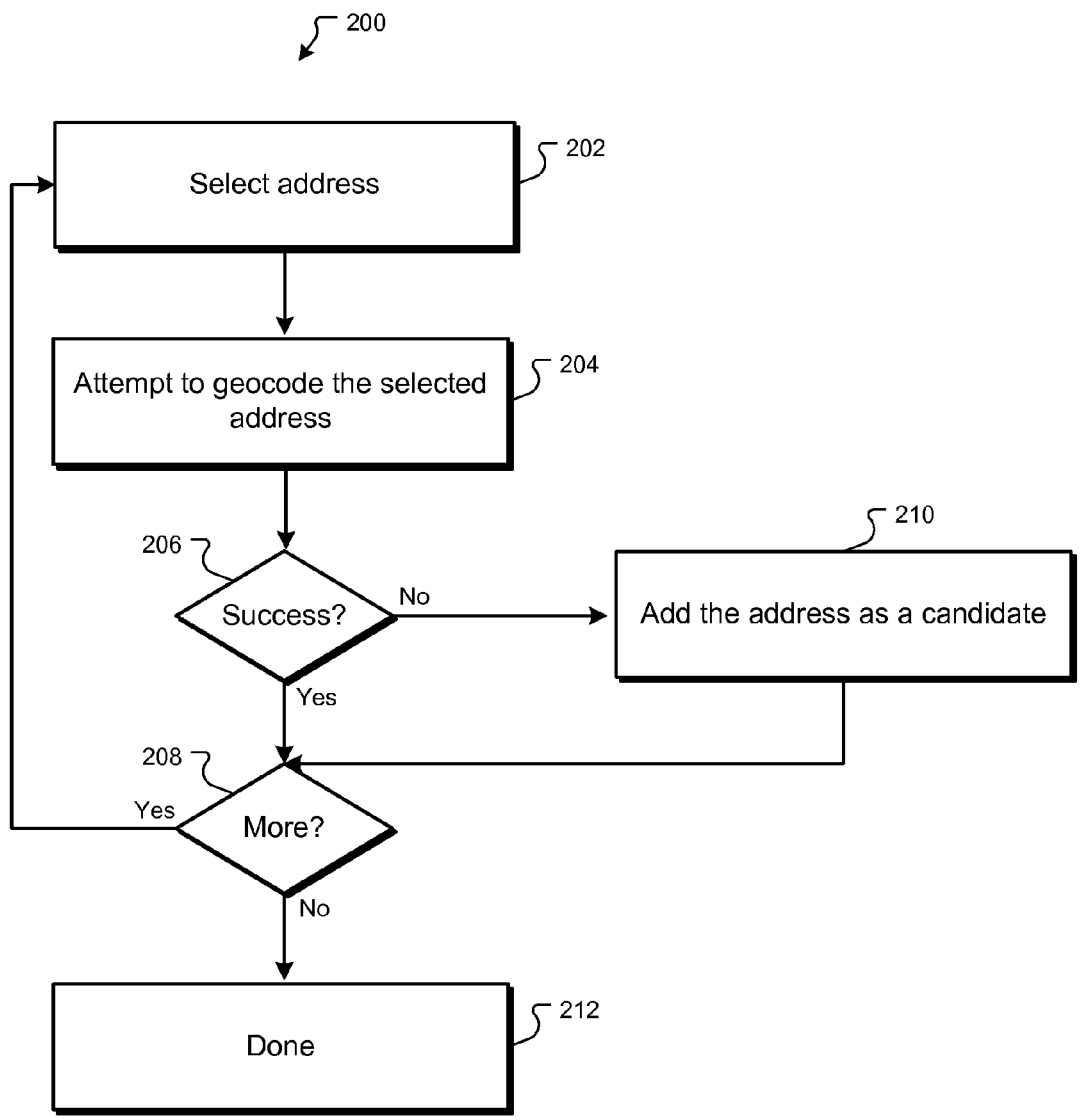
FIG. 2 is a flow diagram of an example process for determining candidate addresses potentially having address terms not recognized by a geocoding system.

FIG. 2 is a flow diagram of an example process 200 for determining candidate addresses potentially having address terms not recognized by a geocoding system. The process 200 can be performed by, for example, the candidate address engine 108 of FIG. 1. For purposes of illustration, the process 200 will be described with respect to a system of one or more computers that performs the process 200.

The system selects an address from a corpus of addresses (step 202). The corpus of addresses can be, for example, a list of addresses compiled by a postal service, or a list of addresses submitted to an online mapping service. The system can select addresses randomly or in an order, e.g., alphabetically.

The system attempts to geocode the selected address (step 204). The system can send the address to a geocoding system, e.g., the geocoding system 106 of FIG. 1. If the attempt to geocode the address is successful (step 206), then the system determines if there are more addresses in the corpus of addresses (step 208) and selects another address if there are more addresses (return to step 202). If the attempt to geocode the address is unsuccessful (step 206), then the system adds the address to a list of candidate addresses that potentially include address terms not recognized by the geocoding system (step 210). When the system has attempted to geocode all the addresses in the corpus, the process is finished (step 212).

Figure 3:
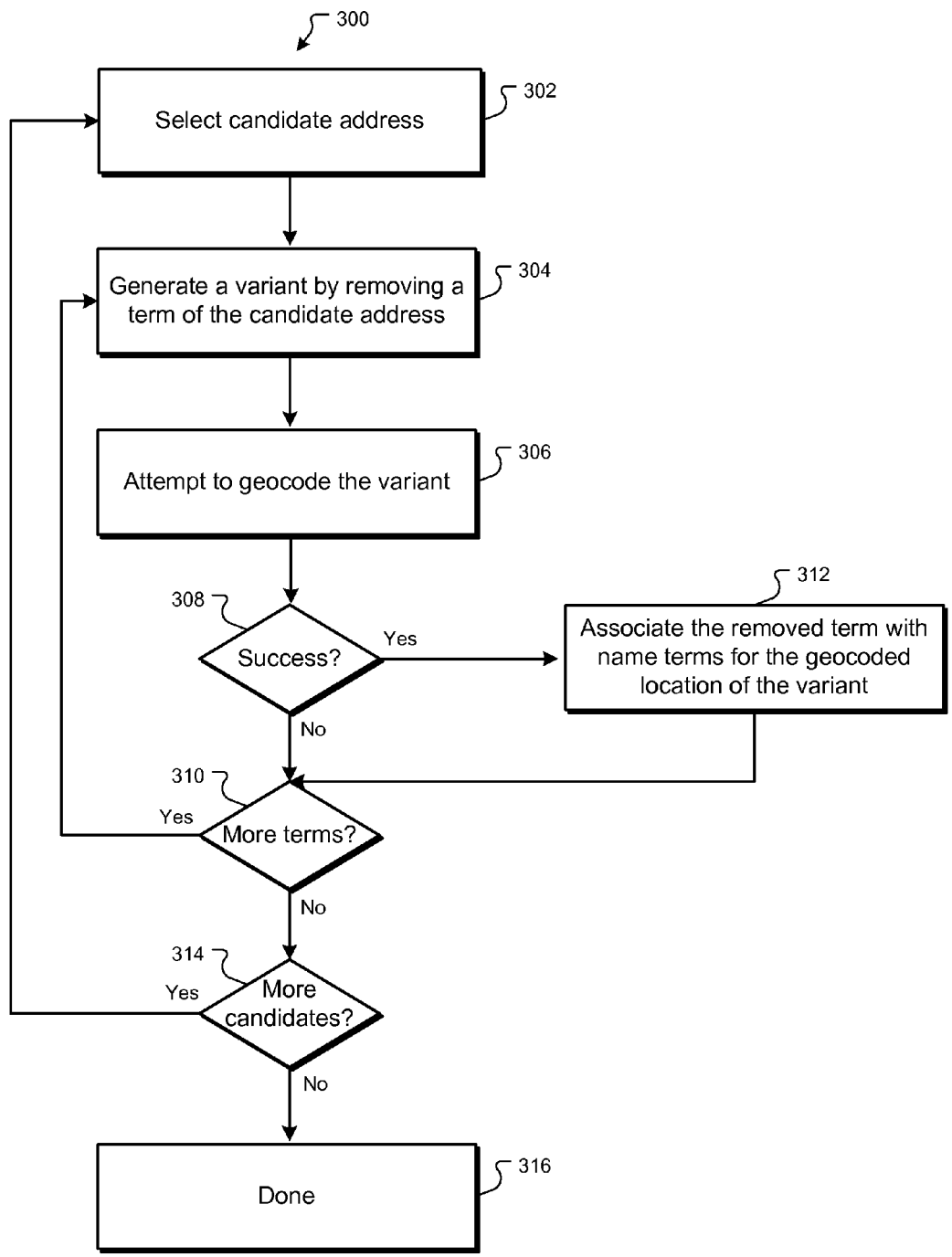
FIG. 3 is a flow diagram of an example process for generating variants of candidate addresses and attempting to geocode the variants.

FIG. 3 is a flow diagram of an example process 300 for generating variants of candidate addresses and attempting to geocode the variants. The process 300 can be performed by, for example, the variant generator 110 of FIG. 1. For purposes of illustration, the process 300 will be described with respect to a system of one or more computers that performs the process 300.

The system selects a candidate address, e.g., one of the unsuccessful addresses from the process 200 described above with respect to FIG. 2 (step 302). The system generates a variant of the selected candidate address by removing a term from the candidate address (step 304). Consider the example candidate address "5 Long La, London, N3 UK." In step 304, the system can generate one or more of the following variants:

5 Long La London N3
5 Long La London UK
5 Long La N3 UK
5 Long London N3 UK
5 La London N3 UK
Long La London N3 UK The system attempts to geocode the variant (step 306). If the attempt to geocode the address is unsuccessful (step 308), then the system determines if there are more terms in the candidate address to remove (step 310), and if there are the system generates another variant by removing another term (return to step 304). If the attempt to geocode the address is successful (step 206), then the system associates the removed term with name terms for the geocoded location of the variant (e.g., using the name matching engine 112 of FIG. 1) (step 312). The geocoding system provides the name terms after successfully geocoding the variant.

For illustration, consider the example variant "5 Long London N3 UK" of the candidate address "5 Long La, London, N3 UK." If the geocoding system does not recognize "La" but can nonetheless geocode the variant "5 Long London N3 UK," then the system will associate the removed term "La" with name terms returned by the geocoding system for the variant "5 Long London N3 UK." The names having name terms can include, for example, a street name, a city name, a region name, an International Organization for Standardization (ISO) region code, a country name, a postal code, and a high precision postal code. For this example variant, example names returned by the geocoding system can be:

Street name (English): Long Lane
City (English): London
Region (English): Greater London
Region (ISO code): GB-LND
Country (English): United Kingdom
Country (Welsh): Y Deyrnas Unedig
Postal code: N3-Postal code (high precision): N3 2PR In some implementations, the system associates the removed term (e.g., "La") with each name term of each name (e.g., "Long," "Lane," "London," and so on). In some implementations, the system does not associate the removed term with terms of every name returned by the geocoding system. For example, the system can disregard terms for languages that are not the primary language of the location (e.g., "Y," "Deyrnas," and "Unedig" above because they are Welsh terms and not English terms).

The system can associate removed terms with name terms using various data processing techniques. For example, the system can build a table or other data structure of associated name terms for each removed term having associated name terms. Continuing with the example removed term "La," TABLE 1 below is an example table that associates name terms with the removed term after the system removes that term and successfully geocodes the variant. TABLE 1 illustrates the example situation where the system first successfully geocodes a variant after removing the term "La," so that the number of occurrences of each name term is one.

TABLE 1

| NAME TERM | NUMBER OF OCCURENCES |
|---|---|
| Long | 1 |
| Lane | 1 |
| London | 1 |
| Greater | 1 |
| GB-LND | 1 |
| United | 1 |
| Kingdom | 1 |
| N3 | 1 |
| 2PR | 1 |

To further illustrate this example, suppose that the system continues removing terms from candidate addresses and successfully geocodes variants by removing the term "La" 195 times. The table associating name terms with the removed term "La" can contain the information show in TABLE 2 below.

TABLE 2

| NAME TERM | NUMBER OF OCCURENCES |
|---|---|
| United | 195 |
| Kingdom | 195 |
| Lane | 180 |
| Road | 71 |
| Street | 68 |
| Greater | 67 |
| GB-LND | 62 |
| London | 62 |
| Manchester | 21 |
| Liverpool | 21 |

As shown in TABLE 2, the name terms "United" and "Kingdom" were associated with the removed term "La" 195 times, and thus every time the system removed the term "La" and successfully geocoded the resulting variant. The name term "Lane" was associated with the removed term "La" 180 times, and the name term "Liverpool" was associated with the removed term only 21 times.

The system continues generating variants by determining whether there are more terms that can be removed from the candidate address (step 310), and if there are more terms, removing those terms (return to step 304). The system continues processing candidate addresses by determining whether there are more candidate addresses (step 314), and if there are more candidate addresses, processing those candidate addresses (return to step 302). When the system has processed all the candidate addresses, the system is done (step 316). For example, the system can have many tables like Table 2 for removed terms that resulted in successfully geocoded variants and the number of occurrences of name terms associated with those removed terms.

Figure 4:
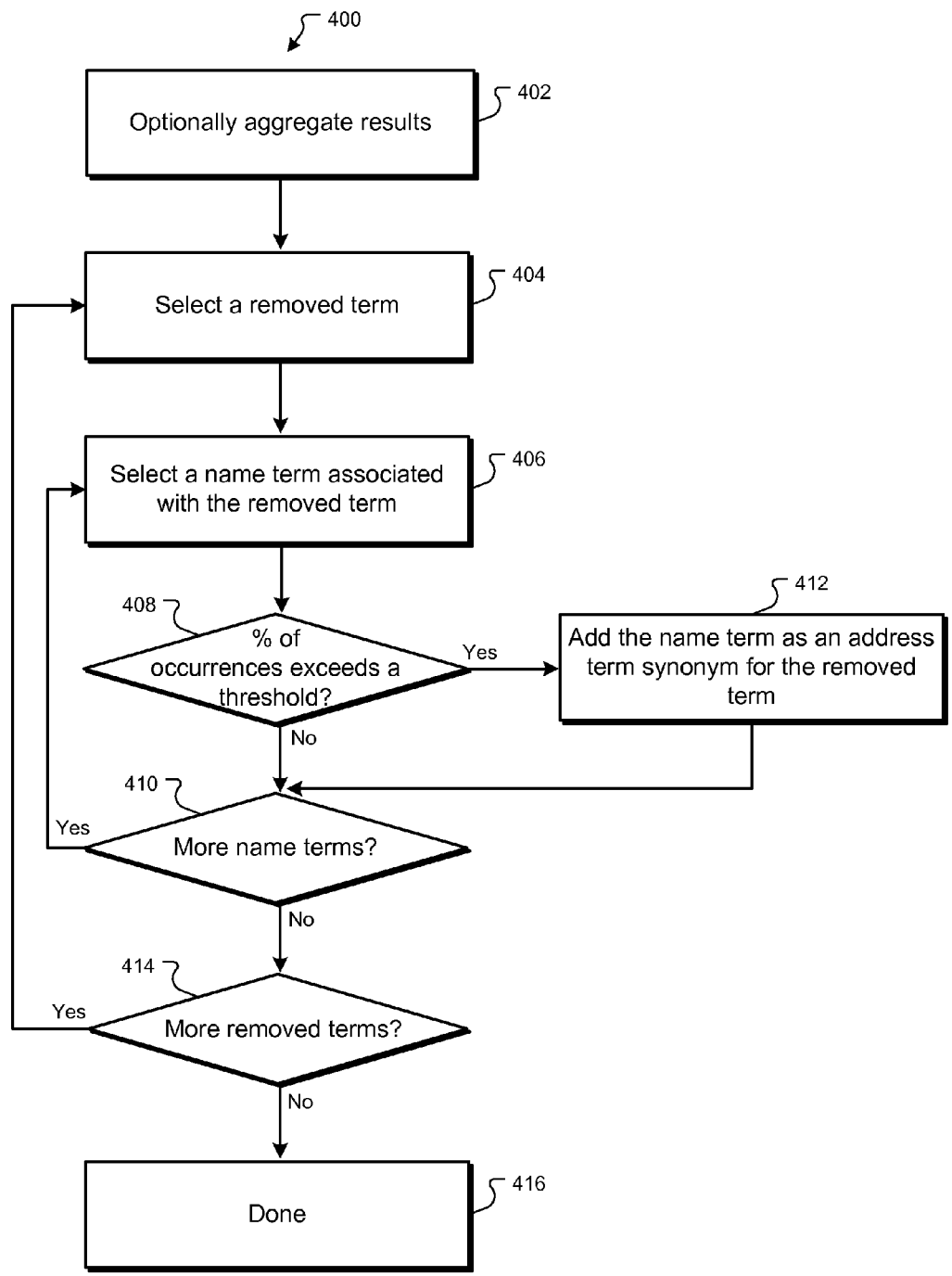
FIG. 4 is a flow diagram of an example process for analyzing the results of attempting to geocode variants of candidate addresses to determine address term synonyms.

FIG. 4 is a flow diagram of an example process 400 for analyzing the results of attempting to geocode variants of candidate addresses to determine address term synonyms. The process 400 can be performed by, for example, the analysis engine 114 of FIG. 1. For purposes of illustration, the process 400 will be described with respect to a system of one or more computers that performs the process 400.

The system optionally aggregates the name terms associated with removed terms (step 402). If the system uses tables to keep track of the number of occurrences of name terms with removed terms (e.g., as illustrated in TABLES 1 and 2), then this step is not necessary. If the system performs this step, then the system determines, for each removed term, the number of times that each name term was associated with the removed term because of a successfully geocoded variant. For example, the system can count each occurrence of an association between a name term and a removed term. The result of aggregating the name terms can be, for example, a table like TABLE2. As an example for a different removed term, "Rd," consider TABLE3 below, which is similar to TABLE2.

TABLE 3

| NAME TERM | NUMBER OF OCCURENCES |
|---|---|
| United | 397 |
| Kingdom | 397 |
| Road | 383 |
| Street | 155 |
| Greater | 151 |
| GB-LND | 147 |
| London | 147 |
| Manchester | 43 |
| Liverpool | 43 |
| Lane | 39 |

TABLE 3 illustrates an example scenario where removing the term "Rd" from a candidate address resulted in a successfully geocoded variant 397 times. The name terms "United" and "Kingdom" were associated with the removed term "Rd" all 397 times. The name term "Road" was associated 383 times, and the name term "Lane" was associated only 39 times.

The system selects a removed term (step 404). The system selects a name term associated with the removed term (step 406). The system determines whether the percent of occurrences of the selected name term for the removed term exceeds a threshold percent (step 408). The percent of occurrences of the selected name term is the number of occurrences of the name term (the number of times it was associated with the removed term) divided by the total number of times that removing the term from a candidate address resulted in a successfully geocoded variant (optionally multiplied by 100 to determine a true percentage).

For purposes of illustration, consider TABLES 2 and 3. In TABLE 2, the percent of occurrences of "United" is 100% because it was associated with the removed term "La" each time removing that term resulted in a successfully geocoded variant. The percent of occurrences of "Lane" is 92% because it was associated 180 times out of 195, and the percent of occurrences of "Manchester" is 11% because it was associated 21 times out of 195. In TABLE 3, the percent of occurrences of "United" is again 100%, the percent of occurrences of "Road" is 96% because it was associated 383 times out of 397, and the percent of occurrences of "Lane" is 10% because it was associated 39 times out of 397.

If the percent of occurrences exceeds the threshold, the system adds the name term as an address term synonym for the selected removed term (step 412). For example, the system can build a list of address term synonyms for the removed term. The threshold can be set higher or lower to capture a greater or lower number of synonyms. For example, consider TABLE 2. A threshold of 90% would result in a list of address term synonyms for "La" of "United," "Kingdom," and "Lane," whereas a threshold of 30% would result in a list also including "Road," "Street," and "Greater."

The system continues by determining whether there are more name terms (step 410), and if there are more name terms, selecting another name term (return to step 406). When there are no more associated name terms for the removed term, the system determines whether there are more removed terms (step 414), and if there are more removed terms, the system selects another removed term (step 404). When there are no more removed terms, the system is done (step 416).

It can be useful to remove certain popular name terms from consideration as address term synonyms. For example, considering TABLES 2 and 3, the name terms "United" and "Kingdom" are popular name terms that are unlikely to be good address term synonyms for "La" and "Rd." In some implementations, prior to step 404, the system performs the process 500 described below with respect to FIG. 5 to remove name terms from consideration as address term synonyms.

Figure 5:
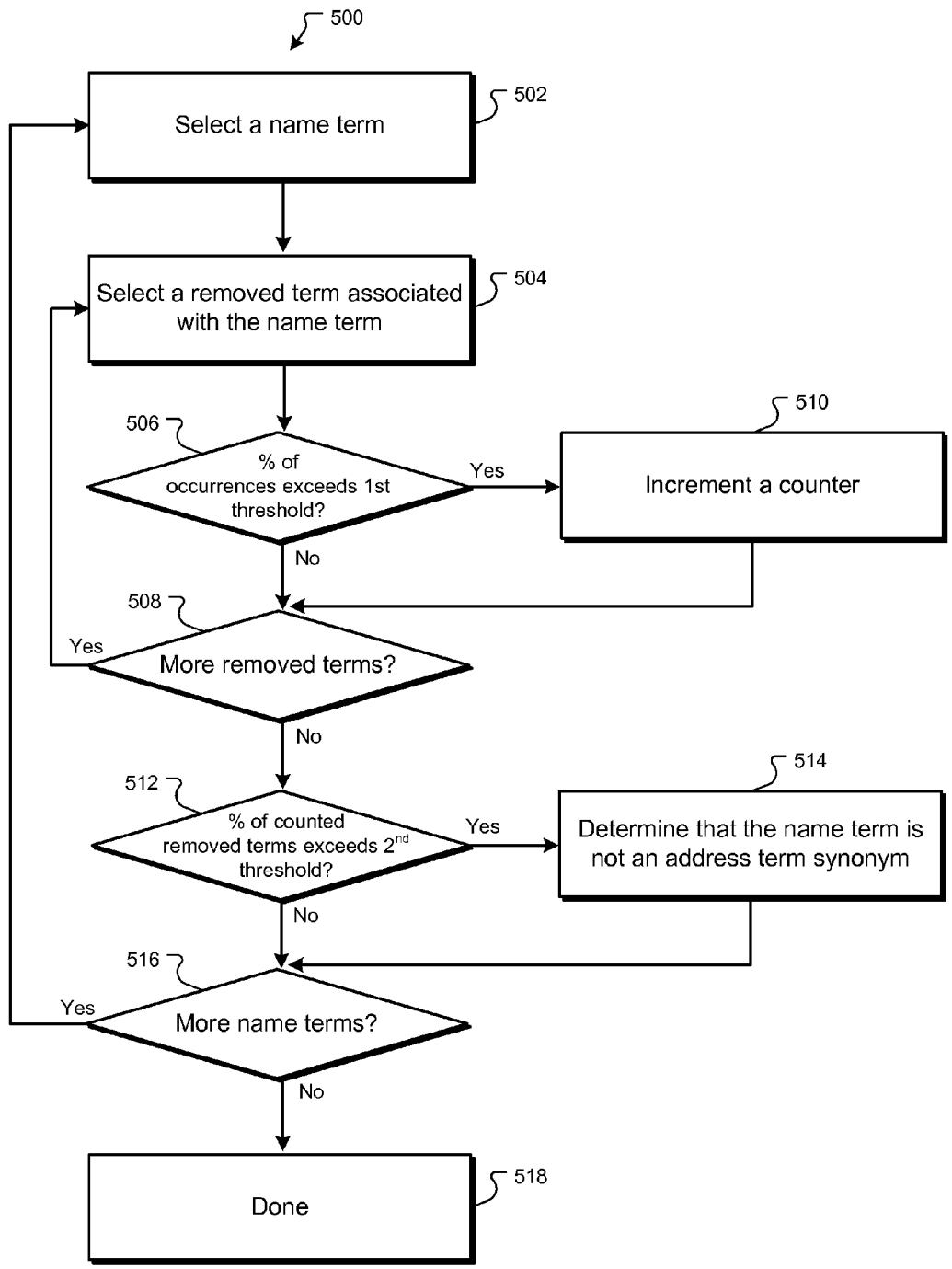
FIG. 5 is a flow diagram of an example process for removing name terms from consideration as address term synonyms.

FIG. 5 is a flow diagram of an example process 500 for removing name terms from consideration as address term synonyms. The process 500 can be performed by, for example, the analysis engine 114 of FIG. 1. For purposes of illustration, the process 500 will be described with respect to a system of one or more computers that performs the process 500.

The system selects a name term (step 502). The selected name term is a name term that is associated with any removed terms. The system selects a removed term associated with the name term (step 504). The system determines whether the percent of occurrences of the selected name term for the removed term exceeds a first threshold percentage (e.g., 80%) (step 506), and if it does, the system increments a counter (step 510). In any event, the system determines whether there are more removed terms associated with the name term (step 508), and if there are more, continues selecting the removed terms (return to step 504).

When the removed terms associated with the selected name term have been considered, the system determines whether the percent of counted removed terms exceeds a second threshold percentage (e.g., 90%) (step 512). The percent of counted removed terms is the number of terms counted by the counter of step 510 divided by the total number of removed terms associated with the name term (optionally multiplied by 100 for a true percentage). For example, consider TABLES 2 and 3 and the name "United." That name term is associated with the two removed terms "La" and "Rd." For each of those removed terms, the percent of appearances of "United" is 100%, so the counter of step 510 would be incremented twice. Because there are two removed terms, the percent of counted removed terms would be 100%.

If the percent of counted removed terms exceeds the second threshold percentage, then the system determines that the name term is not an address term synonym for any removed term (step 514). For example, the system can mark the name term as not being an address term synonym, or the system can remove the name term from any data structures like TABLES 2 and 3 that associate name terms with removed terms.

The system determines whether there are more name terms (step 516), and if there are more, the system selects another name term (return to step 502). When there are no more name terms, the system is done (step 518).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:
   determining that a plurality of addresses cannot be geocoded by a geocoding system, wherein each address includes a plurality of terms;
   generating a plurality of variants of the addresses that can be geocoded by the geocoding system, wherein each variant of a respective address lacks a removed term included in the respective address;
   receiving a plurality of name terms for each variant provided by the geocoding system;
   associating each removed term with name terms received for all variants that lack the removed term, including determining, for each associated name term of each removed term, a count of the number of variants for which the geocoding system provided the name term;
   determining, for each associated name term of each removed term, whether the name term is an address term synonym for the removed term based at least in part on the count of the number of variants.

2. The method of claim 1, wherein determining whether the name term is an address term synonym for the removed term comprises:
   determining a total number of variants that lack the removed term; and
   determining whether the count of the number of variants divided by the total number of variants exceeds a threshold, and if it does exceed the threshold, determining that the name term is an address term synonym for the removed term.

3. The method of claim 1, further comprising:
   for each name term associated with any removed term:
      for each removed term associated with the name term, incrementing a counter based on the count of the number of variants of the name term; and
      determining whether to remove the name term from consideration as an address term synonym based on a value of the counter.

4. The method of claim 3, wherein:
   incrementing the counter based on the count of the number of variants comprises:
      dividing the count of the number of variants by a total number of variants that lack the removed term; and
      determining whether the count of the number of variants divided by the total number of variants that lack the removed term exceeds a first threshold, and if so, incrementing the counter; and
   determining whether to remove the name term from consideration includes:
      dividing the counter by a total number of removed terms associated with the name term; and
      determining whether the counter divided by the total number of removed terms exceeds a second threshold, and if so, determining to remove the name term from consideration as an address term synonym.

5. The method of claim 1, further comprising providing a list of removed terms and address term synonyms for the removed terms for human inspection.

6. The method of claim 1, further comprising, for each removed term having any address term synonyms, adding the address term synonyms to a repository of address term synonyms for the geocoding system.

7. The method of claim 1, wherein determining that a plurality of addresses cannot be geocoded by a geocoding system includes attempting to geocode each potential address in a corpus of potential addresses by sending each potential address to the geocoding system.

8. The method of claim 7, wherein each potential address is an address for a same country.

9. The method of claim 1, wherein the geocoding system is configured to geocode addresses having missing terms.

10. The method of claim 1, wherein the names for a geocoded location of a variant include one or more of: a street name, a city name, a region name, an International Organization for Standardization (ISO) region code, a country name, a postal code, and a high precision postal code.

11. A system of one or more computers configured to perform operations comprising:
  determining that a plurality of addresses cannot be geocoded by a geocoding system, wherein each address includes a plurality of terms;
  generating a plurality of variants of the addresses that can be geocoded by the geocoding system, wherein each variant of a respective address lacks a removed term included in the respective address;
  receiving a plurality of name terms for each variant provided by the geocoding system;
  associating each removed term with name terms received for all variants that lack the removed term, including determining, for each associated name term of each removed term, a count of the number of variants for which the geocoding system provided the name term;
  determining, for each associated name term of each removed term, whether the name term is an address term synonym for the removed term based at least in part on the count of the number of variants.

12. The system of claim 11, wherein determining whether the name term is an address term synonym for the removed term comprises:
  determining a total number of variants that lack the removed term; and
  determining whether the count of the number of variants divided by the total number of variants exceeds a threshold, and if it does exceed the threshold, determining that the name term is an address term synonym for the removed term.

13. The system of claim 11, the operations further comprising:
  for each name term associated with any removed term:
    for each removed term associated with the name term, incrementing a counter based on the count of the number of variants of the name term; and
    determining whether to remove the name term from consideration as an address term synonym based on a value of the counter.

14. The system of claim 13, wherein:
  incrementing the counter based on the count of the number of variants comprises:
    dividing the count of the number of variants by a total number of variants that lack the removed term; and
    determining whether the count of the number of variants divided by the total number of variants that lack the removed term exceeds a first threshold, and if so, incrementing the counter; and
  determining whether to remove the name term from consideration includes:
    dividing the counter by a total number of removed terms associated with the name term; and
    determining whether the counter divided by the total number of removed terms exceeds a second threshold, and if so, determining to remove the name term from consideration as an address term synonym.

15. The system of claim 11, the operations further comprising providing a list of removed terms and address term synonyms for the removed terms for human inspection.

16. The system of claim 11, the operations further comprising, for each removed term having any address term synonyms, adding the address term synonyms to a repository of address term synonyms for the geocoding system.

17. The system of claim 11, wherein determining that a plurality of addresses cannot be geocoded by a geocoding system includes attempting to geocode each potential address in a corpus of potential addresses by sending each potential address to the geocoding system.

18. The system of claim 17, wherein each potential address is an address for a same country.

19. The system of claim 11, wherein the geocoding system is configured to geocode addresses having missing terms.

20. The system of claim 11, wherein the names for a geocoded location of a variant include one or more of: a street name, a city name, a region name, an International Organization for Standardization (ISO) region code, a country name, a postal code, and a high precision postal code.

21. A non-transitory computer storage medium encoded with a computer program, the program comprising instructions that when executed by data processing apparatus cause the data processing apparatus to perform operations comprising:
  determining that a plurality of addresses cannot be geocoded by a geocoding system, wherein each address includes a plurality of terms;
  generating a plurality of variants of the addresses that can be geocoded by the geocoding system, wherein each variant of a respective address lacks a removed term included in the respective address;
  receiving a plurality of name terms for each variant provided by the geocoding system;
  associating each removed term with name terms received for all variants that lack the removed term, including determining, for each associated name term of each removed term, a count of the number of variants for which the geocoding system provided the name term;
  determining, for each associated name term of each removed term, whether the name term is an address term synonym for the removed term based at least in part on the count of the number of variants.

22. The computer storage medium of claim 21, wherein determining whether the name term is an address term synonym for the removed term comprises:
  determining a total number of variants that lack the removed term; and
  determining whether the count of the number of variants divided by the total number of variants exceeds a threshold, and if it does exceed the threshold, determining that the name term is an address term synonym for the removed term.

23. The computer storage medium of claim 21, the operations further comprising:
  for each name term associated with any removed term:
    for each removed term associated with the name term, incrementing a counter based on the count of the number of variants of the name term; and
    determining whether to remove the name term from consideration as an address term synonym based on a value of the counter.

24. The computer storage medium of claim 23, wherein:
  incrementing the counter based on the count of the number of variants comprises:
    dividing the count of the number of variants by a total number of variants that lack the removed term; and
    determining whether the count of the number of variants divided by the total number of variants that lack the removed term exceeds a first threshold, and if so, incrementing the counter; and
  determining whether to remove the name term from consideration includes:
    dividing the counter by a total number of removed terms associated with the name term; and determining whether the counter divided by the total number of removed terms exceeds a second threshold, and if so, determining to remove the name term from consideration as an address term synonym.

25. The computer storage medium of claim 21, the operations further comprising providing a list of removed terms and address term synonyms for the removed terms for human inspection.

26. The computer storage medium of claim 21, the operations further comprising, for each removed term having any address term synonyms, adding the address term synonyms to a repository of address term synonyms for the geocoding system.

27. The computer storage medium of claim 21, wherein determining that a plurality of addresses cannot be geocoded by a geocoding system includes attempting to geocode each potential address in a corpus of potential addresses by sending each potential address to the geocoding system.

28. The computer storage medium of claim 27, wherein each potential address is an address for a same country.

29. The computer storage medium of claim 21, wherein the geocoding system is configured to geocode addresses having missing terms.

30. The computer storage medium of claim 21, wherein the names for a geocoded location of a variant include one or more of: a street name, a city name, a region name, an International Organization for Standardization (ISO) region code, a country name, a postal code, and a high precision postal code.

* * * * *